United States Patent

Toulan, Jr. et al.

[11] 4,326,283
[45] Apr. 20, 1982

[54] CARTRIDGE ALIGNMENT SYSTEM

[75] Inventors: Roy D. Toulan, Jr., Beverly Farms; Richard Rensky, Burlington, both of Mass.

[73] Assignee: Quality Audio Components, Inc., Woburn, Mass.

[21] Appl. No.: 183,180

[22] Filed: Sep. 2, 1980

[51] Int. Cl.³ ............................ G11B 3/06; G01B 5/24
[52] U.S. Cl. ........................................ 369/55; 369/56; 33/180 R
[58] Field of Search .................. 33/180 R; 369/55, 56

[56] References Cited

U.S. PATENT DOCUMENTS

| | | | |
|---|---|---|---|
| 2,815,583 | 12/1957 | Stoodley | 33/180 R |
| 3,183,004 | 5/1965 | Miessner | 369/56 |
| 3,283,411 | 11/1966 | Steward | 33/180 R |
| 3,493,234 | 2/1970 | Voss et al. | 369/55 |

Primary Examiner—John W. Shepperd
Attorney, Agent, or Firm—Weingarten, Schurgin & Gagnebin

[57] ABSTRACT

A stereo stylus playback cartridge alignment system is disclosed in which the cartridge is aligned in accordance with and based upon the Baerwald formulae at an optimum position and angle so that the playback stylus more closely approximates the position of the cutting stylus utilized in making the recording while minimizing tracking distortion across the radius of a given record size. The system includes the utilization of an alignment disc which has a hole in its center and which is adapted to be placed over the record turntable's spindle. The disc is provided with a precisely positioned sight line, in one embodiment, in the form of a raised ridge, which is aimed at the pivot point for the tone arm and is further provided with an indented point which locates the proper position of the stylus tip. A grid surrounding the point enables the twisting of the cartridge to proper alignment when the sides of the cartridge are in alignment with the lines on the grid.

14 Claims, 6 Drawing Figures

CARTRIDGE ALIGNMENT SYSTEM

FIELD OF INVENTION

This invention relates to audio reproduction apparatus and more particularly to an alignment method and apparatus for the alignment of the playback stylus carried by a pivoted tone arm.

BACKGROUND OF THE INVENTION

The master for a stereo record is generally cut by a cutting stylus which is driven inwardly in a straight line along a radius of the record. Thus the cutting stylus executes a transverse movement to provide the spiral grooves and is driven in such a manner that with respect to the sides of the grooves made, the stylus simultaneously contacts both sides of the groove along a radius. It will therefore be appreciated that at any instant of time opposing sides of a groove are formed by motion of a stylus which simultaneously contacts opposing sides of the groove along the record radius. Note that the stylus is in effect drawn tangent to the groove.

In consequence, the inward lateral or transverse motion of the cutting stylus when the original lacquered master is made always takes place along a radius of the record, which is the line passing through the stylus tip and the turntable spindle. It will be appreciated that the only way to obtain an identical waveform out of the terminals of a playback cartridge as went into the terminals of the cutter head is to duplicate this lateral motion without any angular errors at the tip of the playback stylus. This duplication is impossible with conventional pivoted tone arms because they move in an arc as opposed to being moved laterally across the record.

If, as is the case in all pivoted tone arms, the lateral motion of the playback stylus is not exactly along a radius, the result is not only simple harmonic inter-modulation distortion, as has been popularly assumed, but also frequency inter-modulation and frequency cross-modulation distortion, which are time dispersive and therefore much more audible and disturbing.

If a reference signal, for instance coming from a phonograph record, is riddled with frequency inter-modulation and frequency cross-modulation distortion, a listener cannot tell how good or bad the components are that he is listening to. Therefore, all subjective evaluations of audio equipment where phonograph records are the program source must be considered highly suspect unless the cartridge has been aligned within 0.005 inches. It will be appreciated that one way to make virtually certain that the cartridge is misaligned is to mount it dead straight ahead and trued up in the head shell of a tone arm that in turn is mounted on the turntable. This is because almost all commercially available tone arms have head shells which are not aligned in the appropriate manner.

When the stylus is mounted so as to minimize the angular error at the tip of the playback stylus, there is an unexpected benefit especially in a large percentage of 12 inch LP records both old and new which will sound excellent when the information in their grooves is extracted unaltered by cartridge alignment error. In general, gross cartridge misalignment can result in up to 10% total harmonic distortion which is unacceptable.

Most record changers or turntables are provided with a rigid pivoted tone arm which must swing in an arc and therefore cannot possibly track radially as is the case when the lateral cutter is used. What may be less obvious is the precise relationship between the resultant tracking error and the corrective offset angle/overhang geometry of a typical tone arm. A typical mistake is to assume that it is the tracking error that must be minimized. Actually, it is the tracking distortion, which happens to be directly proportional to the tracking error but inversely proportional to the radial distance of the groove from the spindle. Consequently what must be minimized is the "ratio" of the tracking error to its radial distance. The correct way to formulate the basic mathematical question about optimum lateral tracking geometry is therefore the following: with a tone arm of given effective length, over a total recorded area of given maximum and minimum radii, the question is what combination of off-set angle and overhang will yield the smallest possible peak values of the ratio of the tracking error to groove radius. In 1941 this question was definitively solved by H. G. Baerwald in which he defined two points at which the alignment of the cartridge is to be such that the cartridge is tangent to the grooves at these two points. These are said to be zero-error points, with the first about ⅓ of the way into the recording area, and the second close to but still a small distance away from the inner most groove. What he found was that with optimum offset angle and overhang, these zero points are fixed regardless of arm length, as long as the maximum and minimum radii of the recorded area are specified and that a tone arm cartridge aligned to these points resulted in the smallest possible peak values of tracking distortion as set forth above. Thus correct tone arm geometry is not a matter of opinion in that for any given set of conditions there exists only one optimum solution.

For a 30 centimeter LP record with a recorded area between the IEC standard maximum and minimum radii of 146.05 and 60.32 mm, zero tracking error can be obtained in all cases at radii of 120.9 mm and 66.0 mm. Table 1 reproduced hereinbelow relates the effective arm length, optimum overhang and optimum offset angle required to achieve zero tracking error at the two aforesaid points.

TABLE 1

| Effective Arm Length (mm) | Optimum Over-hang (mm) | Optimum Offset Angle (°) | Effective Arm Length (mm) | Optimum Overhang (mm) | Optimum Offset Angle (°) |
|---|---|---|---|---|---|
| 200 | 21.1 | 27.9 | 238 | 17.4 | 23.1 |
| 201 | 20.9 | 27.7 | 239 | 17.3 | 23.1 |
| 202 | 20.8 | 27.6 | 240 | 17.2 | 22.9 |
| 203 | 20.7 | 27.4 | 241 | 17.2 | 22.8 |
| 204 | 20.6 | 27.3 | 242 | 17.1 | 22.7 |
| 205 | 20.5 | 27.1 | 243 | 17.0 | 22.6 |
| 206 | 20.4 | 27.0 | 244 | 16.9 | 22.5 |
| 207 | 20.3 | 26.8 | 245 | 16.9 | 22.4 |
| 208 | 20.2 | 26.7 | 246 | 16.8 | 22.3 |
| 209 | 20.0 | 26.6 | 247 | 16.7 | 22.2 |
| 210 | 19.9 | 26.4 | 248 | 16.6 | 22.1 |
| 211 | 19.8 | 26.3 | 249 | 16.6 | 22.0 |
| 212 | 19.7 | 26.2 | 250 | 16.5 | 21.9 |
| 213 | 19.6 | 26.0 | 251 | 16.4 | 21.9 |
| 214 | 19.5 | 25.9 | 252 | 16.4 | 21.8 |
| 215 | 19.4 | 25.8 | 253 | 16.3 | 21.7 |
| 216 | 19.3 | 25.6 | 254 | 16.2 | 21.6 |
| 217 | 19.2 | 25.5 | 255 | 16.2 | 21.5 |
| 218 | 19.1 | 25.4 | 256 | 16.1 | 21.4 |
| 219 | 19.0 | 25.3 | 257 | 16.0 | 21.3 |
| 220 | 18.9 | 25.1 | 258 | 16.0 | 21.2 |
| 221 | 18.9 | 25.0 | 259 | 15.9 | 21.1 |
| 222 | 18.8 | 24.9 | 260 | 15.8 | 21.1 |
| 223 | 18.7 | 24.8 | 261 | 15.8 | 21.0 |
| 224 | 18.6 | 24.7 | 262 | 15.7 | 20.9 |
| 225 | 18.5 | 24.5 | 263 | 15.6 | 20.8 |

TABLE 1-continued

| Effective Arm Length (mm) | Optimum Overhang (mm) | Optimum Offset Angle (°) | Effective Arm Length (mm) | Optimum Overhang (mm) | Optimum Offset Angle (°) |
|---|---|---|---|---|---|
| 226 | 18.4 | 24.4 | 264 | 15.6 | 20.7 |
| 227 | 18.3 | 24.3 | 265 | 15.5 | 20.6 |
| 228 | 18.2 | 24.2 | 266 | 15.4 | 20.6 |
| 229 | 18.1 | 24.1 | 267 | 15.4 | 20.5 |
| 230 | 18.1 | 24.0 | 268 | 15.3 | 20.4 |
| 231 | 18.0 | 23.9 | 269 | 15.3 | 20.3 |
| 232 | 17.9 | 23.8 | 270 | 15.2 | 20.2 |
| 233 | 17.8 | 23.6 | 271 | 15.1 | 20.2 |
| 234 | 17.7 | 23.5 | 272 | 15.1 | 20.1 |
| 235 | 17.6 | 23.4 | 273 | 15.0 | 20.0 |
| 236 | 17.6 | 23.3 | 274 | 15.0 | 19.9 |
| 237 | 17.5 | 23.2 | 275 | 14.9 | 19.9 |

As can be seen the measurements necessary are time consuming and difficult when utilizing machinist scales which are necessary in order to obtain a no greater position error than 0.005 inches.

In the past at least one alignment tool has utilized the Baerwald two point system to simplify the alignment of cartridges within their head shells. This alignment tool is manufactured by Dennesen and utilizes a translatable trammel, at the end of which is affixed a pointer. The trammel is releaseably mounted to a base which has a spindle hole and a point at the 66 millimeter Baerwald point. This jig operates on the finding, pointed out in the Audio Critic; volume 1, No. 6, Spring through Fall 1978, page 46, that with respect to the computations of Table I, the product of the effective arm length and the sine of the optimum offset angle are constant and equal to 93.4 millimeters. This length corresponds to the length of the perpendicular from the lateral pivot point of the tone arm to the rearward extension of the long axis of the cartridge.

As will be appreciated, utilizing the Dennesen alignment tool, the base is first placed over the spindle and the trammel is then moved backward and forward until the pointer is directly over the pivot point for the tone arm. While alignment utilizing machinist scales took as much as 2½ hours, the Dennesen device permits cartridge alignment within several minutes.

By way of background, the Dennesen device required optical alignment of the pointer by viewing the point of the pointer from positions on all sides of the pivot point of the tone arm. As such, the pointer/pivot relationship is determined by viewing the pointer at one point, and the possibility for error is great since this single point system provides an inadequate reference for accurately fixing the trammel/pointer directly over the tone arm pivot point. The trammel must be moved in a groove in its base and then must be tightened down at the appropriate point which requires considerable manual dexterity. Moreover, it should be pointed out, that the Dennesen device utilizes the inner of the two Baerwald points and operates the trammel from a position on the opposite side of the spindle from the side at which the Baerwald point is located.

By way of reference, the original computations of H.G. Baerwald are carried in the December 1941 issue of the "Journal of the Society of Motion Picture Engineers".

SUMMARY OF THE INVENTION

A stereo stylus playback cartridge alignment system is disclosed in which the cartridge is aligned at an optimum position and angle so that the playback stylus more closely approaches the position of the cutting stylus utilized in making the recording. The system includes the utilization of an alignment disc which has a hole in its center and which is adapted to be placed over the record turntable's spindle. The disc is provided with a slight line, in one embodiment, in the form of a raised ridge which is aimed at the pivot point for the tone arm and is further provided with an indented point which locates the proper position of the stylus tip. A grid surrounding the point enables the twisting of the cartridge into proper alignment when the sides of the cartridge are in alignment with the lines on the grid.

It will be seen that subject alignment device and method utilizes a sight line or sight ridge which is aimed at the pivot point for the tone arm. It has been found that alignment within 0.005 inches is in fact accomplished by virtue of this sighting and results in the type of accurate alignment required without the utilization of moving parts. Although it was thought that the pointer system Dennesen was required for the required accuracy, sufficiently close alignment may be obtained utilizing the sight line concept.

While the subject invention is described utilizing the outer of the two Baerwald points, it will be appreciated that the inner of the Baerwald points could be utilized with the sight line concept, with the sight line existing on a diametrically opposite side of the spindle from the point. It will however be appreciated that providing the sight line on the side of the spindle closest to the second of the Baerwald points results in easier sighting since the eye of the person doing the alignment need not be carried to the back of the changer or turntable. This aids in the ease and convenience of utilizing the subject device and system.

In operation, the disc with the sight line or ridge is placed over the turntable spindle and is rotated such that the sight line extension coincides with the pivot point of the tone arm. The stylus point is then placed at the Baerwald point which may be indented and the stylus cartridge is then rotated until the stylus shaft becomes aligned with the center grid line perpendicular to the record radius using the scribed grid on the disc as a reference guide.

It will also be appreciated that it is not necessary to provide a full disc but rather any type of flat material having the appropriate scribings, holes and detents may be utilized.

In a preferred embodiment, the disc is made of similar thickness to that of a phonograph record so that vertical alignment error can be minimized.

DESCRIPTION OF THE DRAWINGS

These and other objects of the subject invention may be better understood in connection with the following description taken in connection with the drawings of which.

DETAILED DESCRIPTION

Figure 1:
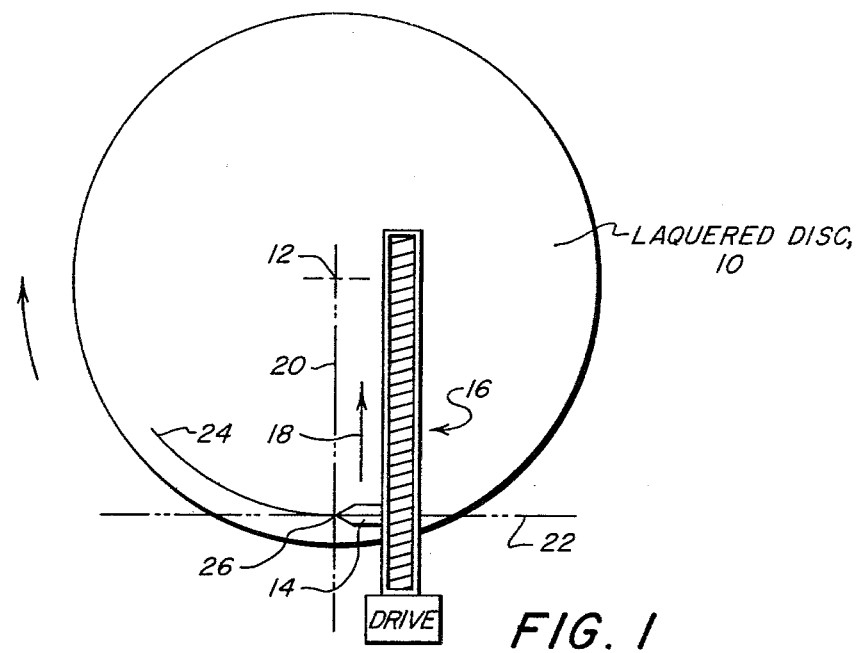
FIG. 1 is a diagramatic illustration in top view of the lateral cutting stylus drive.

As mentioned hereinbefore, the grooves of a modern 12 inch phonorecord contain a stereo signal created by the motion of the cutting stylus applied to a lacquered disc so as to provide spiral grooves. Referring now to FIG. 1, such a lacquered disc is illustrated at 10 with a spindle center illustrated at 12 and a stylus 14 driven in a lateral direction by a screw type drive generally indicated at 16, such that the stylus moves in the direction of arrow 18 along a radius 20 of the lacquered disc. For purposes of the subject exposition, the significant motion of the cutting stylus is lateral from the outer most groove to the inner most groove. This lateral motion occurs along radius 20 passing through the stylus tip and center point 12 of the phonorecord. Note that the stylus shaft assembly has a center line 22 which is tangent to the groove 24 formed at point 26 due to stylus contact with the surface of the lacquered disc.

Figure 2:
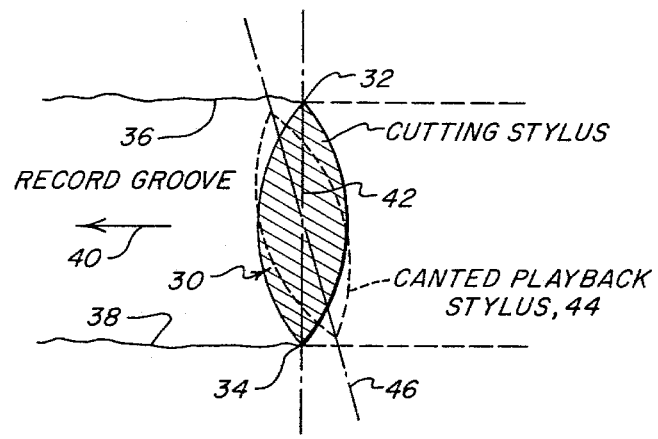
FIG. 2 is a diagramatic illustration and cross-section of the position of the cutting stylus relative to the cut groove versus the canted position of a playback stylus, which canting results when pivoted tone arms are utilized.

Referring to FIG. 2, microscopic examination indicates that a stylus tip here illustrated at 30 can be considered as having two opposing points 32 and 34 which provide for the cutting of opposing groove walls 36 and 38. Arrow 40 indicates the direction of the lacquer movement. It will be appreciated that a center line 42 of stylus 30 is perpendicular to the direction of lacquer movement.

Figure 3:
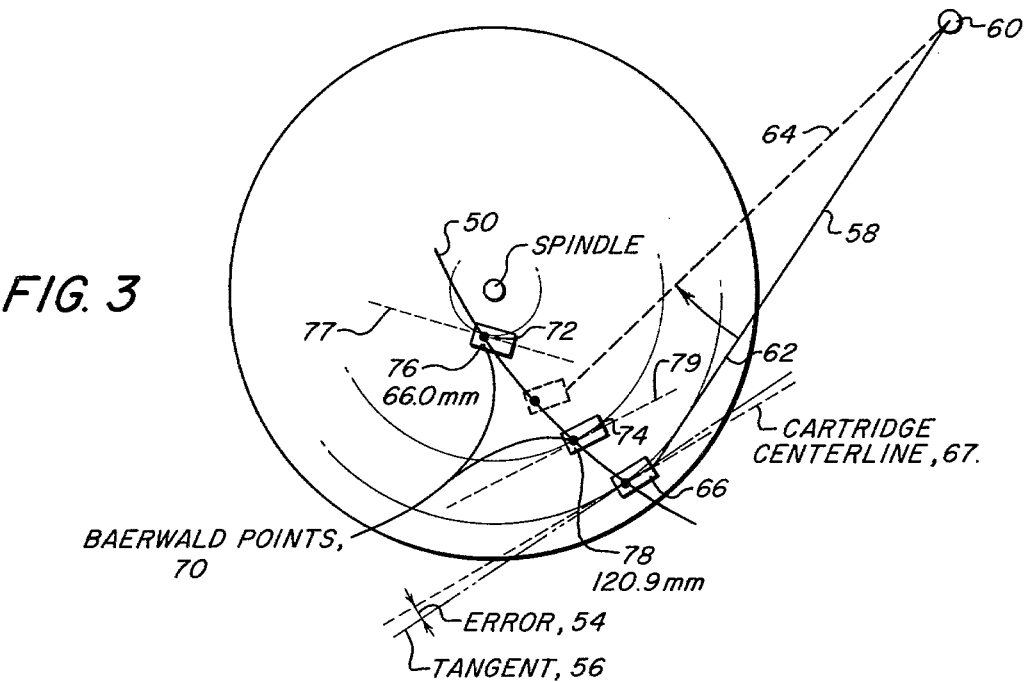
FIG. 3 is a diagramatic representation of the utilization of pivoted tone arm showing the arc traversed by the tone arm as the tone arm moves inwardly towards the center of the record, also showing the two Baerwald points and the proper alignment of the cartridge and position of the stylus at these points.

A canted playback stylus 44 is illustrated in dotted outline as having its axis offset as illustrated by axis 46 when, during the playback of the record, the pivoted tone arm sweeps in an arc 50 as illustrated in FIG. 3 across a recorded disc 52.

What will be apparent from inspection of FIG. 3 is that the recording cartridge is not always aligned perpendicularly to a radius passing through the spindle and the stylus point, such that an error 54 between the tangent at the point of contact and the alignment direction of the stylus can exist. This results in the aforementioned canting of the playback stylus and serious distortion.

As can be seen in FIG. 3, a pivoted tone arm 58 is shown pivoted at point 60 as it goes from the position illustrated at 62 to the position illustrated in dotted line at 64. The tone arm 58 is shown provided with a cartridge 66 the alignment of which is critical. Cartridge 66 is shown having a center line 67 which must be coincident with a tangent to a groove at the Baerwald points in order to establish proper alignment for a phonorecord having a minimum radius of 60.32 mm and a maximum radius of 146.05 mm.

Also shown in FIG. 3 are the Baerwald points 70 existing at 66 millimeters and at 120.9 millimeters from the spindle. As illustrated by cartridges 72 and 74 having stylii at 76 and 78 respectively, Baerwald's theory indicates that these cartridges are to be aligned in a tangential fashion at these points, e.g. along lines 77 and 79 respectively. Baerwald suggests that if the cartridge is tangentially aligned at these two points, an optimum alignment will occur such that the peak values of tracking distortion created by error 54 along the path of arc 50 will be minimized.

Figure 4:
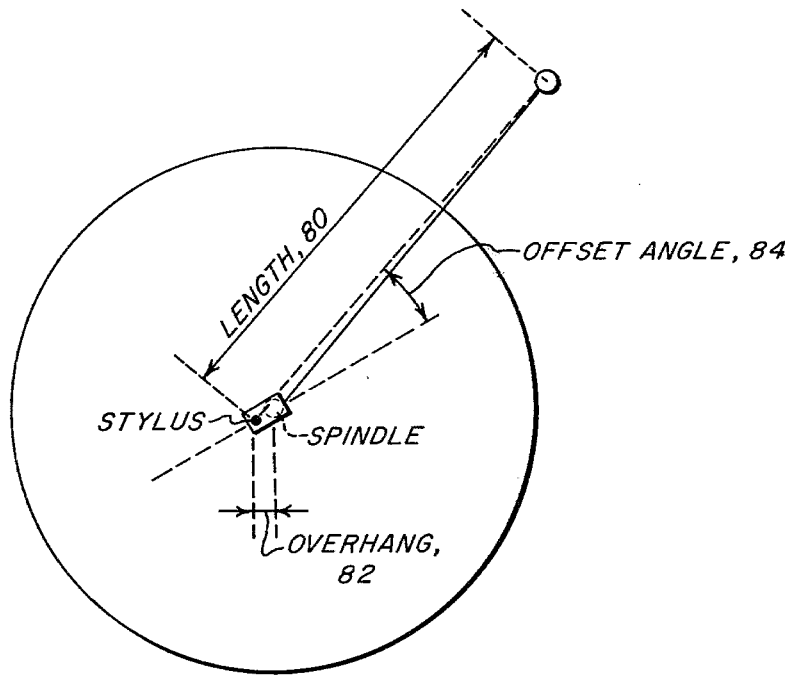
FIG. 4 is a top view illustrating the critical parameters with respect to the tone arm; its effective length, overhang of the stylus, and offset angle.

Critical to the determination of the Baerwald points, and as illustrated in FIG. 4, is the effective length of the tone arm here illustrated by length 80, the overhang of the stylus here illustrated at 82 in which the longitudinal center line of the cartridge passes over the spindle, and the offset angle here illustrated at 84 which is the angle of the cartridge with respect to the tone arm effective length.

As will be appreciated if the tone arm is not straight but is rather S-shaped or has some other shape, the offset angle is difficult to measure as is the overhang and as is the effective length.

Note that arc 50 is the result of contemporary phonorecord tone arms being of a pivoted type. True playback geometry can only be achieved if the tone arm is of the straight line "tangential type". Since this "tangential" type of tone arm has various other problems associated with it, it is usually not used.

Tracking distortion, as mentioned before, is an expression of the ratio of tracking error to the respective radii of each phonorecord group; where tracking error is defined as a deviation in degrees in the position of playback stylus in a particular groove from the true tangent of that groove, which as the position of the original cutting stylus. Tracking distortion is directly proportional to tracking error but inversely proportional to respective radii. Mathematically, minimum tracking distortion is dependent upon the geometry of the playback tone arm and the relative position of the playback stylus to the center and radius of the phonograph record. Minimum tracking distortion is thus a function of the appropriate combination of offset angle and overhand for a tone arm of a given length. Minimum tracking distortion will be achieved between the minimum and maximum of radii of a phonorecord when the aforementioned combination of offset angle and overhang yields minimum peak values of the tracking-radii ratios. Baerwald determined that the correct alignment for minimum peak values of the ratios resulted in two radii points at which tracking error is to be zero, in which the plane created by the playback stylus-shaft assembly is the same plane created by the cutting stylus-shaft assembly at those given radii. Baerwald formulae are logarithmic exhibiting only one mathematical constant, that the product of effective arm length and the size of the offset angle is always 93.4 mm when proper alignment is achieved.

PRIOR ALIGNMENT METHODS

Prior to discussing the subject method and apparatus for cartridge alignment, it should be noted that the method of achieving overhand and offset angle for a pivoted tone arm was previously performed as follows. First, the effective arm length had to be determined by accurate measurement utilizing, for example, a machinist scale. Second, reference to the table of overhang-effective arm length alignments was necessary (see Table 1) to determine the appropriate overhang necessary for the measured effective arm length. Third, overhang measurement was required with a stylus tip, a turntable spindle and lateral swing axis in the same plane, usually horizontal. This measurement required moving of the tone arm over the spindle with the resultant distance between the stylus tip and the center of the turntable spindle measured with a machinist scale.

Fourth, if the measured overhand proved to be improper for the effective arm length as determined from the aforesaid tables, the stylus and cartridge in which it was mounted had to be moved either toward or away from the spindle to effect proper overhang. Note, however, that this movement effected a different effective arm length and thus a different appropriate overhang.

Moreover, since effective arm length and overhang are inversely proportional, the method of achieving the proper combination was iterative in nature and time consuming.

Fifth, the cartridge-stylus assembly had to be checked for proper lateral alignment at the two zero error points. Properly aligned, the plane created by the stylus-shaft assembly would have been perpendicular to the phonograph record radius at each of the zero error points. If not perpendicular, the cartridge-stylus had to be twisted to achieve the proper alignment. This last procedure required the fabrication of an alignment protractor with three points marked thereon; from the center of the phonograph record to the outer edge, the second point had to be 66.0 millimeters from the first point and third 120.9 millimeters from the first point. A hole was then required at the first point, which was exactly centered and 7.2 millimeters in diameter. Grids were then to be drawn at each of the last 2 points, which grid lines were parallel and perpendicular to the phonograph record radius passing through all three points described above. These points and the surrounding grids formed the two zero error points and a guide for twisting the playback cartridge to achieve true tangency at the points. If true tangency could not be achieved at these two points, the aforementioned overhang and offset measurements had to be redone for accuracy.

As can be seen, the above procedure was and is complicated and relatively inaccurate since several critical measurements were required with an accuracy of 0.1 millimeter.

Figure 5:
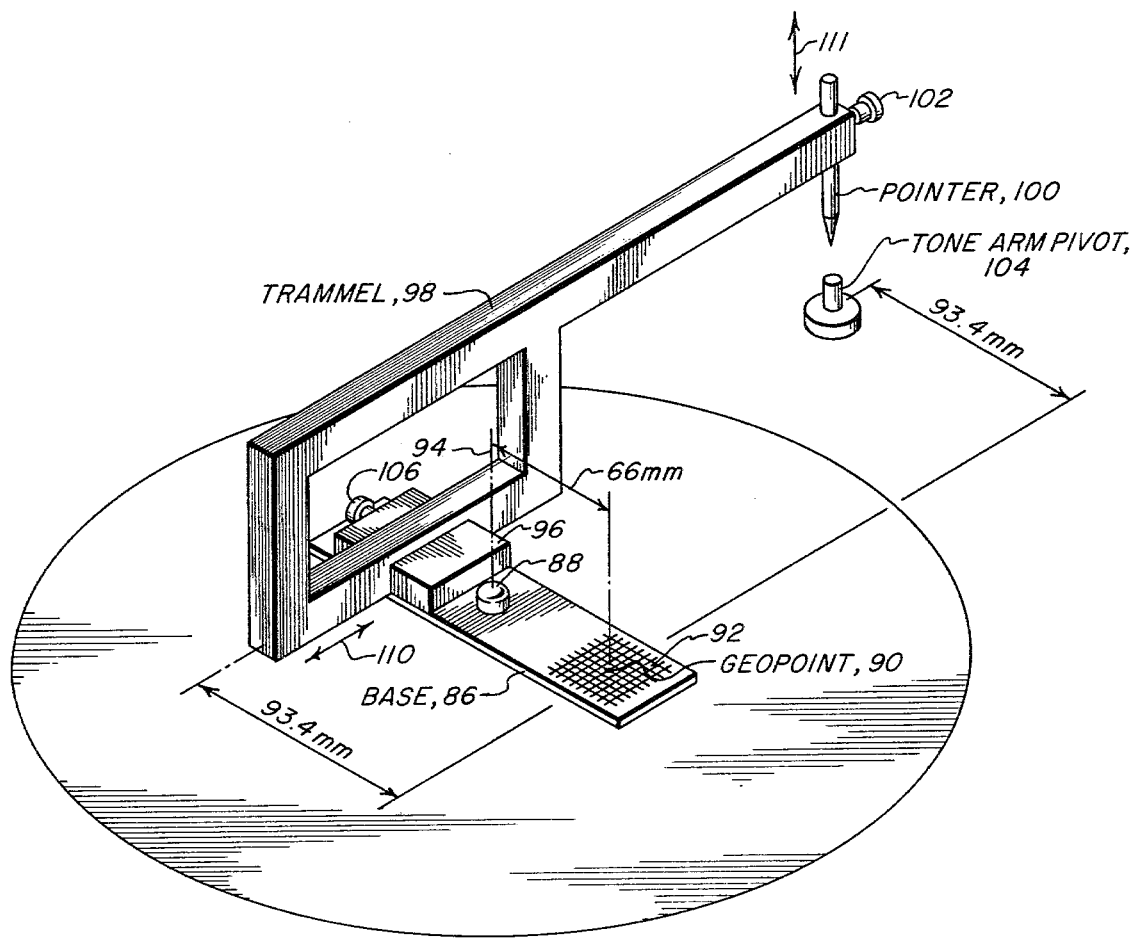
FIG. 5 is a diagramatic representation of the prior art trammel pointer alignment apparatus; and, FIG. 6 is a diagrammatic illustration of the subject alignment disc/sight ridge system for cartridge alignment.

Referring now to FIG. 5, one prior art type of an alignment tool is illustrated in which a base 86 is provided with a spindle hole 88, a geo point indent 90, an alignment grid 92, with geo point 90 being 66 milimeters from the spindle center axis 94. The base was in turn provided with a slotted support member 96 into which was mounted a trammel 98, the outer end of which was provided with a moveable pointer 100 locked into place with a thumb screw 102. Once appropriate alignment was achieved between the pointer 100 and the tone arm pivot 104, trammel 98 was locked into place by a thumb screw 106. After this was achieved, the stylus for the tone arm was set at geo point 90 and the cartridge aligned according to grid 92.

As can be seen from this prior art method of cartridge alignment, relative moving parts i.e. trammel and pointer were required, with movement as illustrated by arrows 110 and 111. It was then necessary to position pointer 100 directly at the center of tone arm pivot 104 by visual inspection from all sides of the tone arm pivot. Once appropriate alignment was established, the trammel was locked into place along with the pointer and alignment of the cartridge on geo point 90 and grid 92 was established.

SIGHT LINE METHOD

Figure 6:
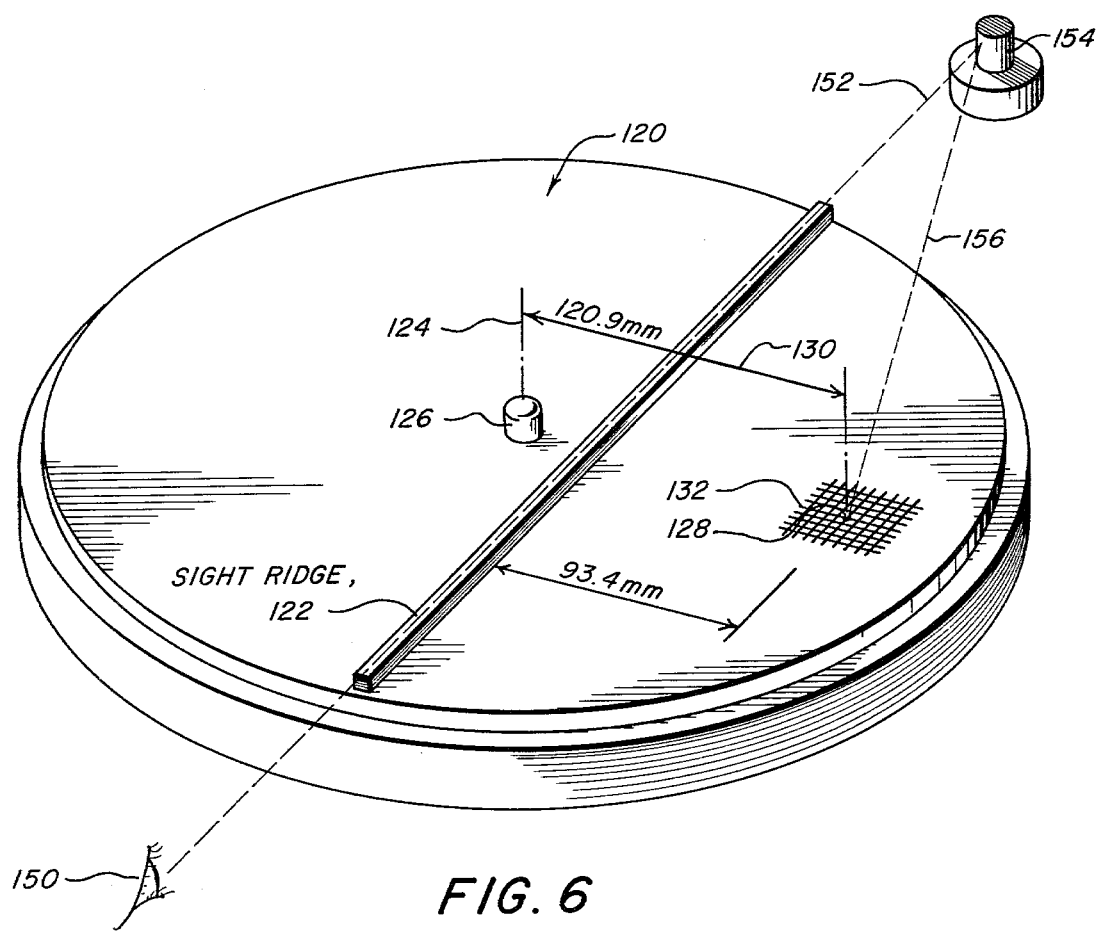

In contra-distinction to this method of alignment and referring now to FIG. 6, in the subject invention, a disc 120 generally of the thickness of a phonograph record is provided with a sight ridge or line 122 which is located 27.5 millimeters from the central axis 124 of spindle 126. A point 128 is provided along a radius 130 at a point 120.9 millimeters from axis 124 and sight line or ridge 122 is oriented orthogonal to this radius. It will be noted that point 128 is located exactly 93.4 millimeters from the sight line and a grid 132 is provided with grid lines running parallel to radius 130 and perpendicular thereto.

In operation, an individual places disc 120 over the spindle of his turntable or changer and aligns the disc, as by eye 150, sighting along sight ridge or line 122 such that extension 152 of the sight line passes through the pivot point 154 of the tone arm. Thereafter the tone arm is shifted to the point illustrated by dotted line 156 and the cartridge is positioned such that the stylus tip rests in depression 128 and such that the cartridge stylus shaft is aligned to and coincides with line 153 using the grid lines as a guide.

What has been provided is a system which utilizes no moving parts and in which alignment is easily achieved to the desired degree of accuracy by merely sighting horizontally along the sight ridge or sight line to the pivot point.

In the preferred embodiment the outer one of the Baerwald points is utilized, although the inner point could be utilized with the sight line being moved to the side of the phonograph record opposite the inner Baerwald point. This is somewhat less convenient since it is desirable to sight and do the alignment from the same side of the spindle.

What has therefore been provided is a sight line type Baerwald alignment system, as opposed to a pointer orientation and translation type system. The present system is easy to use and provides the required accuracy of 0.005 inches in alignment and position.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for assisting in the alignment of a shaft mounted stylus tip mounted to a tone arm pivoted about a vertical axis so as to track across a record located on the central spindle of a turntable comprising:
    a member having an aperture therethrough adapted to fit over said spindle when placed on said turntable, said member including means fixedly positioned on one surface thereof for providing a visual line of sight to the pivot of said tone arm, which sight line is parallel to said one surface and generally perpendicular to said vertical axis, said fixedly positioned means being oriented in a predetermined direction and located at a first predetermined distance from the center of said aperture;
    a mark on said one surface a second predetermined distance from the center of said aperture; and,
    a grid surrounding said mark having at least one line perpendicular to a line between the center of said aperture and said mark, said first predetermined distance minus said second predetermined distance being such that when said stylus tip is placed on said mark and said shaft is aligned with said perpendicular line, said stylus tip is oriented at a point of minimum positional error.

2. The apparatus of claim 1 wherein said grid includes at least one line parallel to said line between the center of said aperture and said mark.

3. The apparatus of claim 1 wherein said fixedly positioned means includes a rib raised above said one surface.

4. The apparatus of claim 1 wherein said fixedly positioned means is integral to said member.

5. The apparatus of claim 1 wherein said fixedly positioned member and mark are to one side of said aperture.

6. The apparatus of claim 1 wherein said mark is indented into said member.

7. The apparatus of claim 1 wherein said member is a disc.

8. The apparatus of claim 1 wherein said member is flat.

9. The apparatus of claim 8 wherein said flat member has the thickness of a phonograph record.

10. The apparatus of claim 1 wherein said point is located at the outer of the two Baerwald points for a record of a predetermined size and wherein said sight signal line is oriented perpendicular to the line between the center of the aperture and said mark.

11. The apparatus of claim 10 wherein said sight line is located 93.4 mm from a line through said mark perpendicular to the line between the center of said aperture and said mark.

12. A method of aligning a stylus tip carried on a stylus shaft attached to a cartridge mounted to the shell at the end of a tone arm which is pivoted about a vertical pivot axis above a turntable having a central spindle, comprising the steps of:

placing a member having an aperture over the turntable spindle, the member having a sight line, a point, and a line through the point running perpendicular to a line from the center of the aperture through the point;

sighting down the sight line and rotating the member until the sight line extension coincides with the pivot axis; and, adjusting the cartridge in the shell such that the stylus tip rests on the point and such that the stylus shaft is aligned with the perpendicular running line.

13. The method of claim 12 wherein said member is a disc.

14. The method of claim 13 wherein the disc has a thickness approximately that of a phonograph record.

* * * * *